United States Patent [19]

Ling

[11] Patent Number: 5,184,544

[45] Date of Patent: Feb. 9, 1993

[54] DEVICE FOR CLEANING VEGETABLE, RICE AND THE LIKE

[75] Inventor: Lin H. Ling, Tainan, Taiwan

[73] Assignee: Chien-Jen Wang, Tainan, Taiwan

[21] Appl. No.: 878,752

[22] Filed: May 5, 1992

[51] Int. Cl.⁵ .................. A47J 43/04; B01D 33/00; B08B 3/04; F26B 17/24

[52] U.S. Cl. .......................... 99/536; 99/495; 99/511; 134/149; 134/157; 134/162; 210/380.1; 366/226; 366/234

[58] Field of Search ............... 99/495, 511, 513, 536, 99/516; 134/157, 158, 198, 200, 149, 162; 210/360.1, 380.1, 477, 474; 366/234, 230, 224, 226, 225

[56] References Cited

U.S. PATENT DOCUMENTS

| 1,294,682 | 2/1919 | Lillibridge | 366/234 |
|---|---|---|---|
| 1,480,646 | 1/1924 | Waller | 366/224 |
| 1,559,346 | 10/1925 | Moore | 134/157 |
| 2,376,627 | 5/1945 | Seiple | 134/162 |
| 2,633,140 | 3/1953 | Wagner | 366/226 |
| 4,007,751 | 2/1977 | Commiant | 134/158 |
| 4,090,310 | 5/1978 | Koff | 99/511 |
| 4,350,087 | 9/1982 | Ramirez | 99/513 |
| 4,702,162 | 10/1987 | Sontheimer et al. | 210/360.1 |
| 4,809,723 | 3/1989 | Meliconi | 99/536 |
| 5,064,535 | 11/1991 | Hsu | 210/380.1 |

FOREIGN PATENT DOCUMENTS 17971 of 1895 United Kingdom ............... 366/234

Primary Examiner—Timothy F. Simone
Attorney, Agent, or Firm—Pro-Techtor International

[57] ABSTRACT

A device for cleaning rice or vegetable such as beans in a tank containing cleaning water is provided. The cleaning water is manually agitated. A removable basket having a perforated bottom is rotatably positioned in the tank. An agitator static with respect to the tank is removably positioned in the basket. Filter screens are mounted to the perforated bottom of the basket.

4 Claims, 4 Drawing Sheets

DEVICE FOR CLEANING VEGETABLE, RICE AND THE LIKE

BACKGROUND OF THE INVENTION

This invention relates to a device for cleaning rice and vegetable such as beans.

Known cleaning devices for cleaning vegetable or fruit are very large in size, or so called industrial size which is not suitable for domestic usage. Cleaning devices of a home appliance for cleaning vegetable, fruit or rice is necessary to simplify daily works of houserwives. Such a home appliance should be compact in size and easy in operation and maintenance.

The present invention is designed to provide a raw material cleaning device with a manually operated agitator wherein a container has apertures to permit passage of foreign particles, which are rinsed off, in association with water while restraining the passage of the raw material such as rice.

DETAILED DESCRIPTION OF A PREFERRED EMBODIMENT

Figure 1:
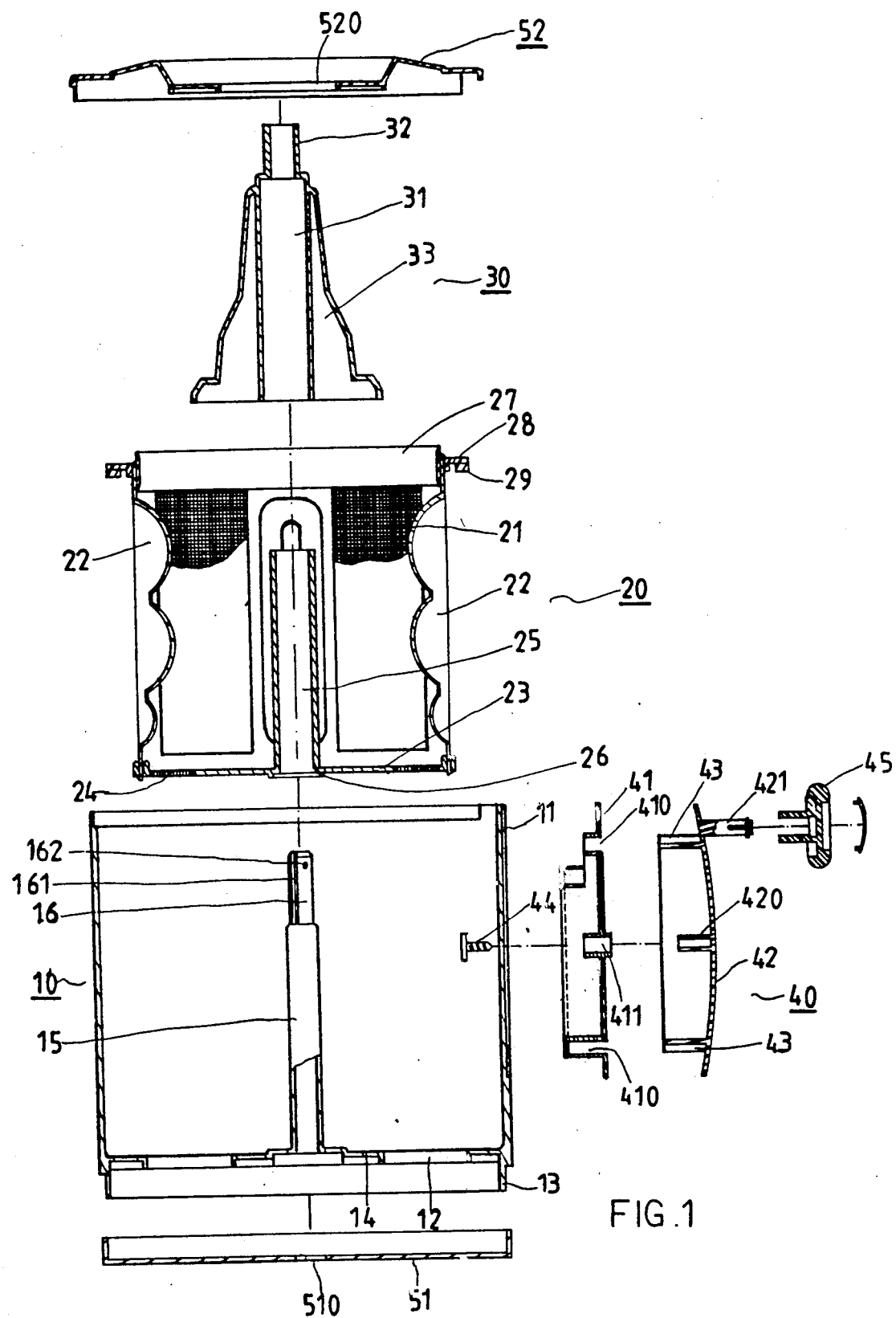
FIG. 1 is an exploded sectional view of a cleaning device according to the present invention.
Figure 2:
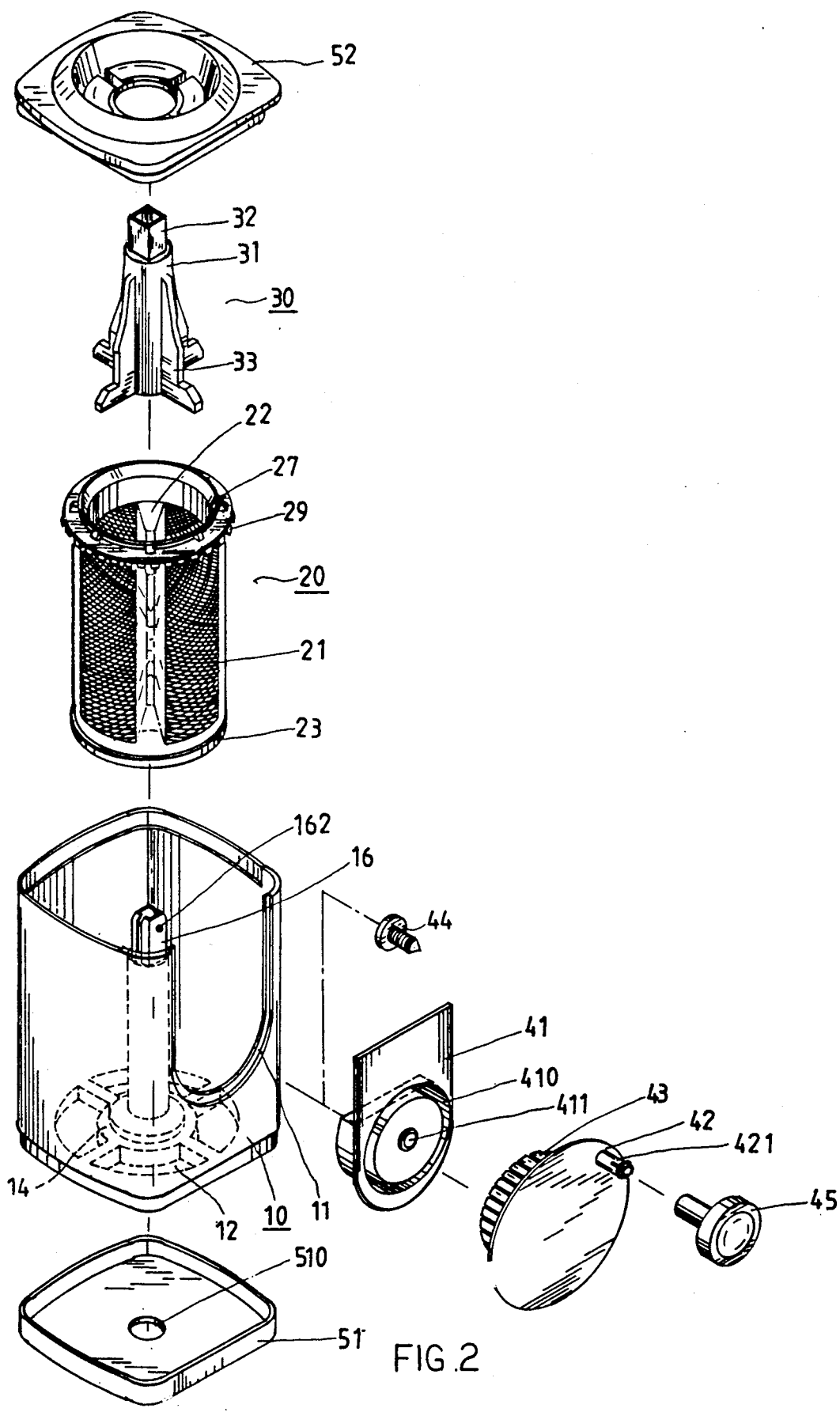
FIG. 2 is an exploded perspective view of the cleaning device shown in FIG. 1.
Figure 5:
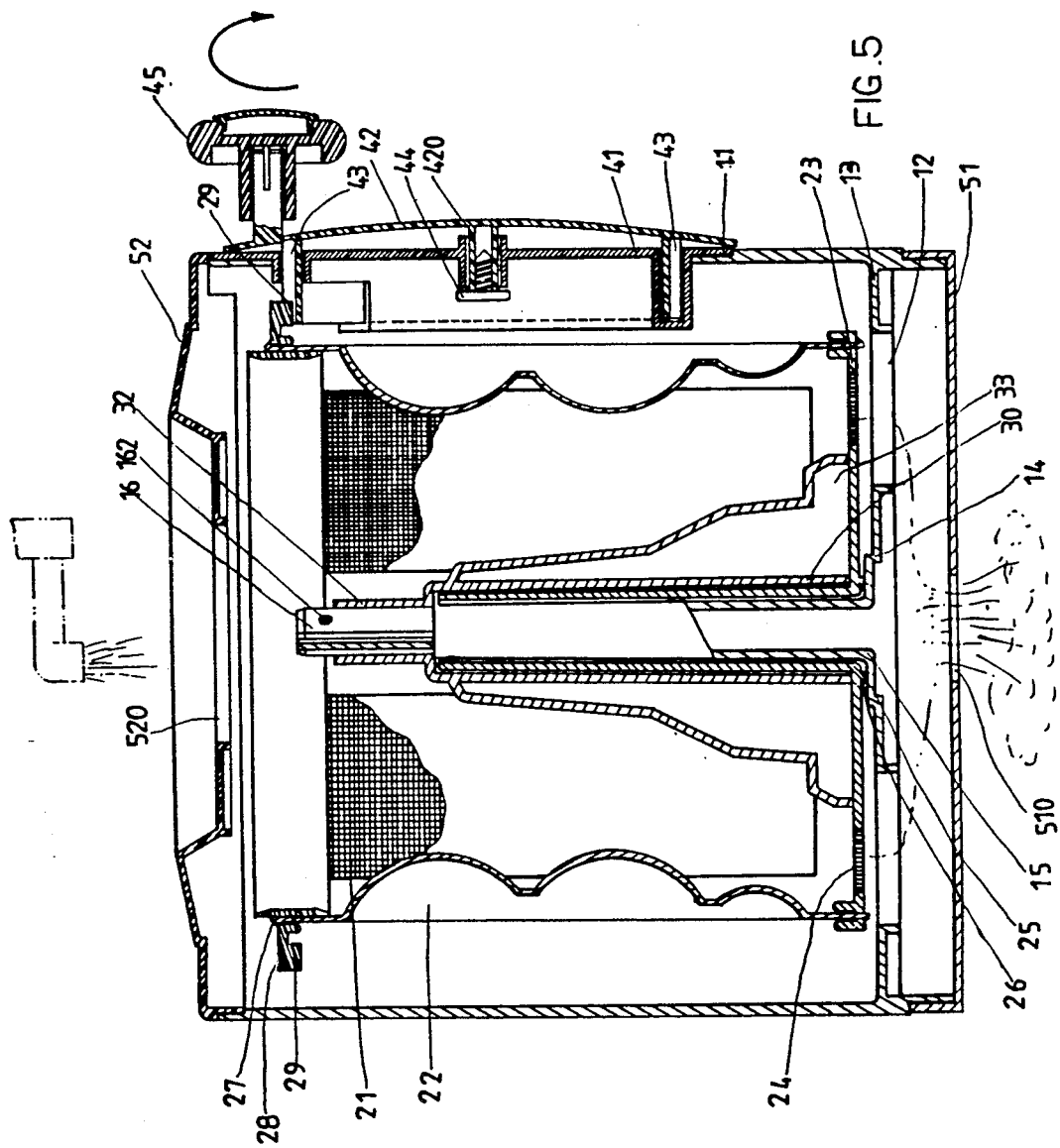
FIG. 5 is a cross-sectional view of the cleaning device which is in an assembled state.

Referring to FIGS. 1, 2 and 5, a cleaning device according to the present invention consists essentially of a tank 10 which has a perforated bottom 14 with a plurality of openings 12 and a bearing pin 15 integrally raised from the central portion of the bottom 14. On top of the bearing pin 15, there is formed with reduced portion 16 which is square in cross section and split longitudinally through its center at 161. A pair of semispherical projections for retaining purpose is integrally located on the reduced portion 16. A skirt 13 is formed around the bottom 14 of the tank 10 and a bottom cap 51 fits over the skirt 13 to close the perforated bottom 14 of the tank 10. The bottom cap 51 is formed with a central hole 510 to drain cleaning water.

Figure 4:
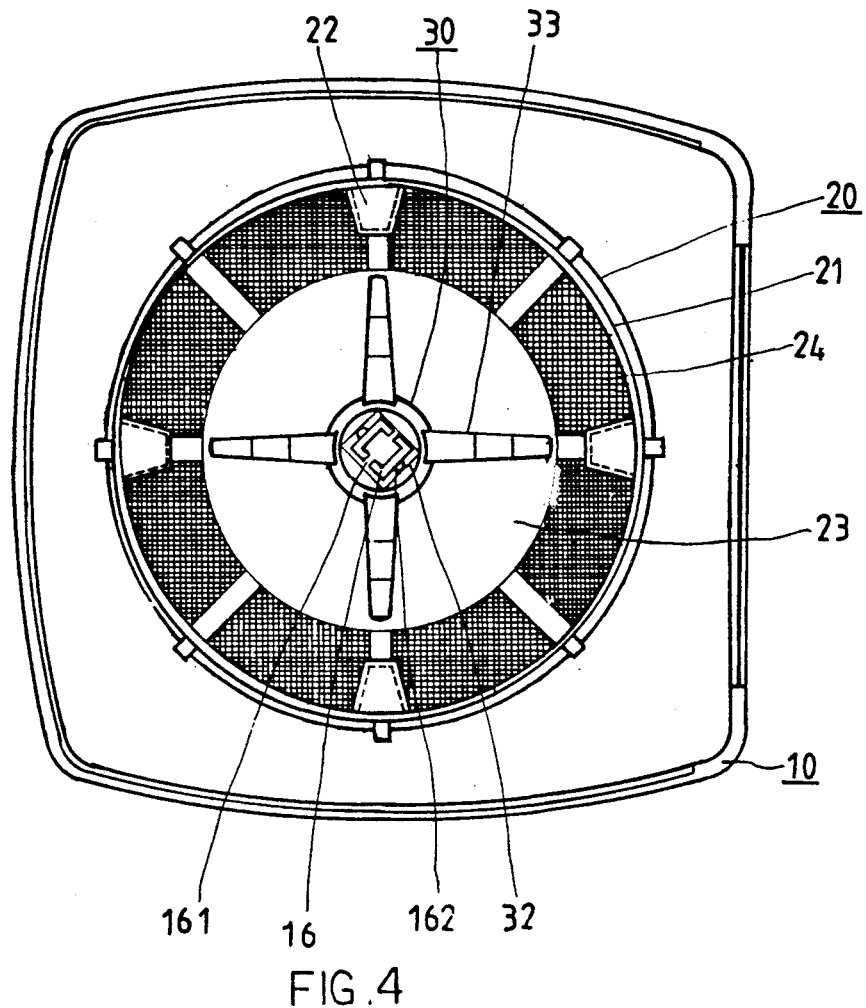
FIG. 4 is a top elevational view of the cleaning device.

Processing of raw material cleaning is carried out within a cylindrical basket 20 having a central sleeve 25 surrounding a hole in its bottom 23 which cooperates with a cylindrical net wall 21 to define an annular containing well for accommodating raw material such as beans or rice to be cleaned. Bottom 23 thereof has apertures 24 which are complementarily fitted with respective filter screens. A plurlity of baffles 22, which extend radially inwardly and are wavy in shape and diverge substantially axially downwardly, are formed in the inner side wall of the cylindrical net wall 21. A top portion 27 of the cylindrical basket 20 has a circumferial rack 28 with teeth 29 at the bottom thereof. The central sleeve 25 of the basket 20 is so dimensioned to rotatably surround the bearing pin 15 in the tank 10 with an annular projection 26 surrounding the bottom opening of the basket 20 resting on the inner side wall of the bottom 14 of the tank, as best shown in FIGS. 4 and 5.

Figure 3:
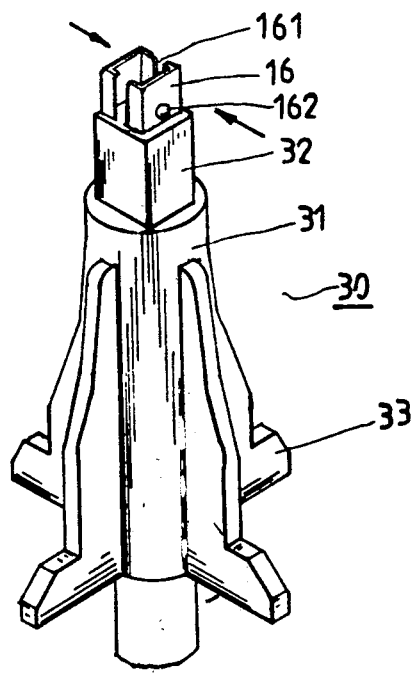
FIG. 3 is a perspective view of an agitator to be used in this invention.

A agitator 30, as shown in FIG. 3, has a central sleeve 31 surrounding a hole in its bottom and adapted to overlie the central sleeve 25 of the basket 20, and a hollow head 32 adapted to be fittingly mounted around the reduced portion 16 of the bearing pin 15 in the tank 10. A plurality of blades 33 each of each is enlarged at the bottom end thereof are evenly spaced around the sleeve 31. A cover 52 covers the tank 10 and has a central opening 520 for feeding water into the basket 20 and tank 10 while the cleaning is processing, as best shown in FIG. 5.

A substantially U-shaped cut-off portion 11 is located in a side wall of the tank 10 for installing a manual operating device. The operating device 40 includes a base 41 formed with an annular groove 410 and an axial hole 411, a wheel 42 integrally formed with a pinion 43 with teeth thereof inter-engageable with the teeth 29 of the annular rack 28 at its inner side wall and a stem 421 eccentrically located at its outer side wall and a knob 45 mounted to the stem 421 in a manner that the knob 45 is turnable with respect to the stem 421. The wheel 42 is further axially formed with a screw stem 420 at its inner side wall within the pinion 43 for securing the wheel 42 to the base 41 by means of a screw 44 in a manner that the wheel 42 is turnable with respect to the base 41. The base 41 can be mounted complementarily to the cut-off portion 11 of the tank 10 by sliding it into a groove along edge of the cut-off portion 11 to water-tightly close the cut-off portion 11 where the pinion 43 of the wheel 42 engages the rack 28 of the basket 20.

In assembly, the basket 20 fits within the tank 10 with the central sleeve 25 thereof surrounding the bearing pin 15 in the tank 10 and the annular bearing projection 26 resting on the bottom 14 of the tank 10. This arrangement allows the basket 20 turnable with respect to the tank 10. The agitator 30 fits within the basket 20 with the central sleeve 31 thereof surrounding the central sleeve 25 of the basket 20. The reduced portion 16 is yieldable whereby it can be squeezed together when the semi-spherical projections 162 are inserted through the hollow head 32 and after passing therethrough can expand to provide the interlock between the agitator 30 and bearing pin 15 of the tank 10. This arrangement prohibits the agitator 30 to rotate with respect to the tank 10.

In operation, rice or vegetable to be cleaned is loaded in the basket 20, then put the cleaning device of this invention under a fountain to continuously feed cleaning water into the cleaning device and drive the basket 20 to rotate by operating the wheel 42 with hand. This sets the cleaning water moving by means of baffles 22 on the inner side wall of the basket 20. The baffles 22 in association with the blades 33 of the agitator 30, which remains static as the basket 20 rotates, swirls the cleaning water thus the cleaning water rinses and thereby cleans the rice or vegetable (not shown) in the basket 20. The central opening 510 of the bottom cap 51 is so dimensioned to drain cleaning water in a rate, while the cleaning water keeps feeding into the cleaning device, that 50% to 60% of the interior of the cleaning device is maintained for a full rinse to the raw material to be cleaned. After cleaning is complete, the water supply is shut off and the cover 52 is removed. Then the basket 20, with the agitator 30, is removed from the tank 10 to unload the raw material already cleaned.

It will be appreciated, of course, that although some particular embodiment of the present invention has been shown and described, modifications may be made. It is intended in the following claims to cover all modifications which fall within the scope of the invention.

I claim:

1. A device for cleaning rice or vegetable such as beans comprising:

a tank having side walls and perforated bottom;

a bearing pin integrally projecting upwardly from a central portion of the perforated bottom of the tank and having an upper portion of square in configuration;

a substantially cylindrical removable basket having net side walls and a perforated bottom including a central opening positioned in the tank;

filter screen means mountable to the perforated bottom of basket in exception to the central opening thereof;

a sleeve in the basket surrounding the central opening in the perforated bottom of the basket and projecting upwardly into the basket to rotatably surround the bearing pin in the tank;

a circumferential rack sleeved around an upper portion of the basket with teeth thereof facing downwardly;

a bearing ring member surrounding the central opening of the basket and located under the perforated bottom and slidably resting on the perforated bottom of the tank;

a plurality of baffle members extending radially inwardly from the net side walls of the basket and divergent axially downwardly;

an agitation member having a cylindrical member with an open bottom for rotatably surrounding the sleeve in the basket and a hollow upper portion having a passageway extending therethrough for fitting receiving the square upper portion of the bearing pin in the tank;

blades members extending radially outwardly from the cylindrical member of the agitation member;

a cover member covering the tank and having a central opening communicating an interior of the tank; and a driving means mounted to one of the side walls of the tank and having a pinion with teeth thereof engageable to the teeth of the circumferential rack for manually operating to drive the basket to rotate with respect to the tank and agitation member.

2. A cleaning device as claimed in claim 1 wherein the square upper portion of the bearing pin in the tank is split longitudinally therethrough and yieldable to be squeezed together to allow a pair of semi-spherical projection located on opposed side walls of the square upper portion to be inserted through the passageway in the hollow upper portion of the agitation member and expand to provide an interlock between the agitation member and bearing pin in the tank after passing therethrough.

3. A cleaning device as claimed in claim 1 wherein a skirt is provided around the bottom of the tank and a cap member fitting over the skirt to close the perforated bottom of the tank has a central opening dimensioned to control a flow rate of cleaning water draining therethrough.

4. A cleaning device as claimed in claim 1 wherein the driving means includes:

a cut-off portion located in one of the side walls of the tank;

a base adapted to close the cut-off portion in the tank and having an annular groove;

a wheel with the pinion integrally located in a first side wall thereof;

connection means rotatably securing the wheel to the base with the pinion disposed within the annular groove;

a knob mounted to a second side wall of the wheel opposite to the first side wall in an arrangement that the knob is rotatable with respect to the wheel.

* * * * *